3,445,452
AZOBENZENE-AZO-ANILINE DYESTUFFS CONTAINING A PYRROLIDINONO, A PIPERIDONO OR A PHTHALIMIDONO GROUP
David J. Wallace and Max A. Weaver, Kingsport, Tenn., assignors to Eastman Kodak Company, Rochester, N.Y., a corporation of New Jersey
No Drawing. Filed Dec. 10, 1965, Ser. No. 513,089
Int. Cl. C09b 33/12, 62/40
U.S. Cl. 260—152                 8 Claims

ABSTRACT OF THE DISCLOSURE

Azobenzene-azo-aniline compounds are useful as dyes for hydrophobic textile materials and are characterized by a heterocyclic group attached to the coupler moiety having the formula

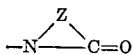

wherein Z represents the carbon atoms completing a pyrrolidinono radical, a piperidono radical, or a phthalimidino radical.

---

This invention relates to disazo compounds particularly useful as dyes for textile fibers, yarns and fabrics. More particularly, this invention relates to disazo compounds of the general formula

I

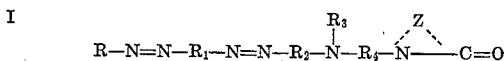

wherein
R represents a monocyclic carbocyclic aromatic radical of the benzene series including unsubstituted and substituted phenyl such as lower alkylphenyl, e.g., o,m,p-tolyl; lower alkoxyphenyl, e.g., o,m,p-methoxyphenyl; halophenyl, e.g., o,m,p-chlorophenyl; nitrophenyl, e.g., o,m,p-nitrophenyl; lower alkylsulfonylphenyl, e.g., o,m,p-methylsulfonylphenyl; lower alkylsulfonamidophenyl, e.g., o,m,p-methylsulfonamidophenyl; lower di(alkylsulfonyl)-phenyl, e.g., 2,5-di(methylsulfonyl)phenyl; dicarboxylicacidimidophenyl, e.g., o,m-succinimidophenyl; fluoroalkylphenyl, e.g., trifluoromethylphenyl; lower alkanoylaminophenyl, e.g., o,m,p-acetamidophenyl; cyanophenyl, e.g., o,m,p-cyanophenyl; carbamoylphenyl, e.g., o,m,p-carbamoylphenyl; benzamidophenyl; thiocyanophenyl, e.g., o,m,p-thiocyanophenyl; lower alkylthiophenyl, e.g., o,m,p-methylthiophenyl; benzylaminophenyl, e.g., o,m,p-benzylaminophenyl; N - alkylbenzaminophenyl, e.g., N-phenylmethylaminophenyl; formylphenyl, e.g., o,m,p-formylphenyl; lower carbalkoxyphenyl, e.g., o,m,p-carbethoxyphenyl; benzoylphenyl, e.g., o,m,p-benzoylphenyl; etc.

$R_1$ and $R_2$ represent monocyclic carbocyclic aromatic radicals of the benzene series including p-phenylene and p-phenylene substituted with lower alkyl, e.g., o,m-methyl-p-phenylene; lower alkoxy, e.g., o,m-methoxy-p-phenylene; halogen, e.g., o,m-chloro-p-phenylene; lower alkanoylamino, e.g., o,m-acetamido-p-phenylene; lower alkylsulfonamido, e.g., methylsulfonamido - p - phenylene; and benzamido, e.g., benzamido-p-phenylene.

$R_3$ represents hydrogen or an alkyl radical preferably lower alkyl, i.e., from 1 to 4 carbon atoms, being unsubstituted or substituted such as hydroxyalkyl, e.g., hydroxyethyl; polyhydroxyalkyl, e.g., 2,3-dihydroxypropyl; lower alkoxyalkyl, e.g., methoxyethyl; cyanoalkyl, e.g., cyanoethyl; cyanoalkoxyalkyl, e.g., β-cyanoethoxyethyl; lower alkanoyloxy, e.g., acetoxyethyl; lower carboalkoxyalkyl, e.g., carbethoxyethyl; halogenoalkyl, e.g., chloroethyl; hydroxyhalogenoalkyl, e.g., β-hydroxy-γ-chloropropyl; lower alkylsulfonylalkyl, e.g., methylsulfonylethyl; lower alkyl—OCOOCH$_2$CH$_2$—, e.g., CH$_3$OCOOCH$_2$CH$_2$—; carbamoylalkyl, e.g., carbamoylethyl; lower alkylcarbamoylalkyl, e.g., ethylcarbamoylethyl; benzyl, phenoxyalkyl, e.g., β-phenoxyethyl; lower alkylsulfonamidoalkyl, e.g., methylsulfonamidoethyl; dicarboximidoalkyl, e.g., β-dicarboximidoethyl, etc. or $R_3$ represents a monocyclic carbocyclic aromatic group of the benzene series, e.g. unsubstituted phenyl and substituted phenyl such as represented by R, $R_1$, and $R_2$ above, e.g. alkylphenyl, alkoxyphenyl, halophenyl, etc. As can be seen from the examples below, the substituents attached to R, $R_1$, $R_2$ and $R_3$ serve primarily as auxochrome groups to control the color of the disazo compounds.

$R_4$ represents a lower alkylene group, i.e., a straight or branched aliphatic chain of from 1 to 4 C atoms or substituted alkylene, e.g. hydroxyalkylene, acyloxyalkylene, chloroalkylene, or cyanoalkylene, Z represents a chain of carbon atoms such as propylene, iso-propylene, butylene,

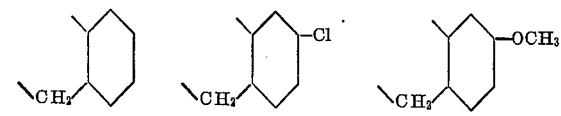

which with

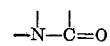

complete a pyrrolidinono radical, a piperidono
Herein, "lower alkyl group," "lower alkylene group" and the like, means that the groups contain a chain of from 1 to 4 carbon atoms, straight or branch chained.

The disazo compounds are obtained by coupling well-known diazotized aminoazo benzene compounds with coupling components having the formula

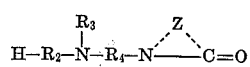

wherein $R_2$, $R_3$, $R_4$ and Z have the meaning given above.
The above coupling component in which the ring

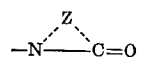

is monocyclic can be prepared by reacting an aniline derivative with butyrolactones or caprolactones as described in our U.S. patent application Serial No. 390,212 filed August 17, 1964, now U. S. Patent 3,342,799. The above coupling components in which the ring is bicyclic can be prepared by reacting an N-aminoalkylaniline with phthalide or substituted phthalides such as chlorophthalide or an alkoxyphthalide, as described in our above U.S. application.

The disazo compounds can be expected to possess properties distinct from similar azo compounds in which the ring

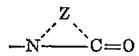

is connected directly to the benzene nucleus of a coupler in that they have better affinity and light fastness for polyesters.

The disazo compounds can be used for dyeing textile materials including synthetic polymer fibers, yarns and fabrics giving a variety of fast shades including yellow to violet shades when applied by conventional dyeing methods. The disazo compounds are useful, for example, for dyeing polyester, polyamide and cellulose acetate fibers and when used for dyeing such hydrophobic fibers should be free of water-solubilizing groups such as carboxyl and sulfo. In general, the disazo compounds have good fastness, for example, to light, washing, gas (atmospheric fumes) and sublimation. The disazo compounds can also be expected to respond favorably to other textile dye tests such as described in the A.A.T.C.C. Technical Manual, 1964 edition, depending in part upon the particular dye used and fiber being dyed.

As can be been from the examples below, the various substituents attached to radicals R, $R_1$, $R_2$, $R_3$, $R_4$ and Z serve primarily as auxochrome groups and disazo compounds particularly useful as textile dyes are obtained within a wide range of substitution.

Polymeric linear polyester materials of the terephthalate type are illustrative of the linear aromatic polyester textile materials that can be dyed with the new disazo compounds of our invention. The terephathalate fibers sold under the trademarks "Kodel," "Dacron" and "Terylene," for example, in the form of filaments, yarn and fabric, for example, are illustrative of the polyester textile materials that can be dyed. Kodel polyester fibers are more particularly described in U.S. Patent 2,901,446. Dacron and Terylene polyester fibers are described, for example, in U.S. Patent 2,465,319. The polymeric linear polyester materials disclosed in U.S. Patents 2,945,010, 2,957,745 and 2,989,363, for example, can be dyed. The linear aromatic polyester materials specifically named have a melting point of at least 200° C.

Nylon, in fiber, yarn and fabric form is representative of polyamides which can be dyed with the disazo compounds.

The disazo compounds of the invention may be used for dyeing hydrophobic fibers such as linear polyester, cellulose ester, acrylic, polyamide, etc. fibers in the manner described in U.S. Patents 2,880,050, 2,757,064, 2,782,187 and 2,043,827. The following examples illustrate methods by which the disazo compounds of the invention can be used to dye polyester textile materials.

0.1 gram of the dye is dissolved in the dye pot by warming in 5 cc. ethylene glycol monomethyl ether. A 2% sodium-N-methyl-N-oleyl taurate and 0.5% sodium lignin sulfonate aqueous solution is added, with stirring, until a fine emulsion is obtained. Water is then slowly added to a total volume of 200 cc. 3 cc. of Dacronyx (a chlorinated benzene emulsion) are added and 10 grams of a textile fabric made of Kodel polyester fibers are entered. The fabric is worked 10 minutes without heat and then for 10 minutes at 80° C. The dyebath is then brought to the boil and held at the boil for one hour. Following this, the fabric is rinsed in warm water, then scoured in an aqueous 0.2% soap, 0.2% soda ash solution. After scouring, the fabric is rinsed with water and dried. Accordingly, since the disazo compounds of the invention are water-insoluble, they can be applied from aqueous dispersions in the manner of the so-called "dispersed dyes." However, coloration can also be effected, for example, by incorporating the disazo compounds into the spinning dope and spinning the fiber as usual. The disazo compounds of our invention have varying utility as dyes. The degree of utility varies, for example, depending upon the material being dyed and the formula of the disazo compound. Thus, for example, all the dyes will not have the same degree of utility for the same material.

The following examples will serve to illustrate our invention.

Example 1

A. Preparation of the coupler.—89.0 g. N-β-aminoethyl-N-ethyl-m-toluidine and 47.3 g. of butyrolactone were refluxed together for 10 hours with water removed. The mixture was distilled in vacuo. The pure product distilled at 150–152° C./.1 mm. and had the structure:

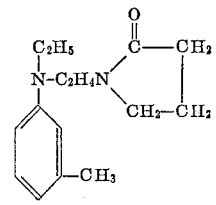

B. Preparation of the dye.—1.8 g. dry $NaNO_2$ was dissolved in 12.5 ml. concentrated $H_2SO_4$. This solution was cooled to about 5° C. and 25 ml. 1:5 acid was added below 10° C. Then 5.97 g. 1-amino-2,5,2′-trimethylazobenzene was added, followed by 25 ml. 1:5 acid. The reaction mixture was stirred two hours at ice-bath temperature, then added to a cold solution of 6.15 g. N-[2-(N′-ethyl-m-toluidinoethyl)]-pyrrolidinone in 50 cc. 1:5 acid. The coupling mixture was neutralized to Congo Red with solid ammonium acetate and allowed to couple two hours. The mixture was drowned with water, filtered, washed with water, and dried. The product dyes nylon a deep red shade of excellent fastness properties. It has the structure:

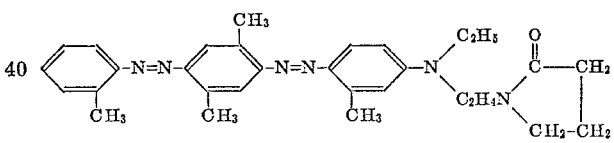

Example 1a

A dye was made according to the conditions of Example 1 except using 5.62 g. o-aminoazotoluene. The product dyes nylon a desirable red shade of excellent fastness properties.

Example 1b

A dye was made according to Example 1 using 4.96 g. p-aminoazobenzene. It dyes nylon a scarlet shade of excellent properties.

Example 1c

A dye was made according to Example 1 using 5.62 g. o-aminoazotoluene and 5.82 g. N-[2-(N′-ethylanilinoethyl)]-pyrrolidinone. The product dyes nylon a scarlet shade of excellent properties.

Example 1d

A dye was made according to Example 1 using 5.97 g. 1-amino-2,5,4′-trimethylazobenzene. The product dyes nylon a deep red shade of excellent properties.

Disazo compounds described in the table below having the following formula are prepared in the manner of the above examples by coupling the indicated aminoazobenzene compounds with the indicated couplers pyrrolidinone coupler. The color is that obtainable on nylon fabric. The dyeing properties of the disazo compounds of the table are comparable to those of the above examples.

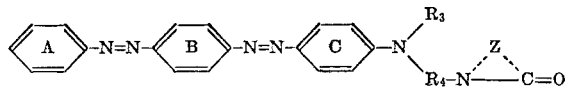

TABLE

| Example Number | Substituents Ring A | Ring B | Ring C | $R_3$ | $R_4$ | Z | Color |
|---|---|---|---|---|---|---|---|
| 2 | None | None | None | $-C_2H_5$ | $-CH_2CH_2-$ | $-CH_2CH_2CH_2-$ | Orange. |
| 3 | 4-Cl | None | None | $-C_2H_4CN$ | $-CH_2CH_2-$ | $-\overset{CH_3}{\underset{\|}{C}}HCH_2CH_2-$ | Do. |
| 4 | 3-Cl | 2-$CH_3$ | 3-$CH_3$ | $-C_2H_4CN$ | $-CH_2CH_2CH_2-$ | $-\overset{CH_3}{\underset{\|}{C}}HCH_2CH_2-$ | Do. |
| 5 | 2-Cl | 2-$CH_3$ | 3-$CH_3$ | $-C_2H_4OH$ | $-CH_2CH_2CH_2-$ | $-\overset{CH_3}{\underset{\|}{C}}HCH_2CH_2-$ | Do. |
| 6 | 3,6-di-Cl | 3-$CH_3$ | 3-Cl | $-C_2H_4OH$ | $-CH_2\overset{CH_3}{\underset{\|}{C}}HCH_2$ | 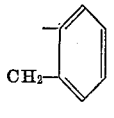 | Do. |
| 7 | 2-$CH_3$ | 3-$CH_3$ | 3-Cl | $-C_2H_4Cl$ | $-CH_2\overset{CH_3}{\underset{\|}{C}}HCH_2$ | 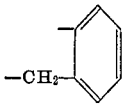 | Do. |
| 8 | 4-$CH_3$ | 3-$CH_3$-6-$OCH_3$ | 3,6-di-$OCH_3$ | $-C_2H_4OCH_3$ | $-CH_2\overset{OH}{\underset{\|}{C}}HCH_2-$ | 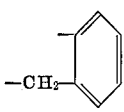 | Violet. |
| 9 | 4-$CH_3$ | 3-$CH_3$-6-$OCH_3$ | 3,6-di-$OCH_3$ | $-C_2H_4OCOCH_3$ | $-CH_2\overset{Cl}{\underset{\|}{C}}HCH_2-$ | $-CH_2CH_2CH_2-$ | Do. |
| 10 | 3-$CH_3$ | 2-Cl | 3-$OCH_3$ | $-C_2H_4CO_2C_2H_5$ | $-CH_2\overset{CN}{\underset{\|}{C}}HCH_2-$ | $-CH_2CH_2CH_2-$ | Red. |
| 11 | 3-$CH_3$ | 3-$OCH_3$ | 3-$NHCOCH_3$ | $-C_2H_4Br$ | $-CH_2CH_2-$ | $-CH_2CH_2CH_2-$ | Red. |
| 12 | 4-$OCH_3$ | 3,6-di-$OCH_3$ | 3,6-di-$CH_3$ | $-C_2H_4SO_2CH_3$ | $-CH_2\overset{OCOCH_3}{\underset{\|}{C}}HCH_2$ | $-CH_2CH_2CH_2-$ | Violet. |
| 13 | 4-$NHCOCH_3$ | 3,6-di-$CH_3$ | 3,6-di-$CH_3$ | $-C_2H_4CONH_2$ | $-CH_2\overset{OCOCH_3}{\underset{\|}{C}}HCH_2$ | $-CH_2CH_2CH_2-$ | Do. |
| 14 | 4-$SO_2NH_2$ | 3-$NHCOCH_3$ | 3-$CH_3$ | $-CH_2CHOHCH_2Cl$ | $-CH_2\overset{OCOCH_3}{\underset{\|}{C}}HCH_2$ | $-CH_2CH_2CH_2-$ | Do. |
| 15 | 4-$NO_2$ | 2-$CH_3$ | 2-$CH_3$ | H | $-CH_2\overset{OCOCH_3}{\underset{\|}{C}}HCH_2$ | $-CH_2CH_2CH_2-$ | Red. |
| 16 | 4-$SO_2CH_3$ | 2-$CH_3$ | 2-$CH_3$ | H | $-CH_2\overset{OCOCH_3}{\underset{\|}{C}}HCH_2$ | $-CH_2CH_2CH_2-$ | Red. |
| 17 | 3-$CH_2OH$ | 2-$CH_3$ | 3-$CH_3$ | H | $-CH_2\overset{OCOCH_3}{\underset{\|}{C}}HCH_2$ | $-CH_2CH_2CH_2-$ | Red. |

What we claim is:
1. A water-insoluble compound having the formula

$$R-N=N-R_1-N=N-R_2-\underset{\underset{R_3}{\|}}{N}-R_4-N\overset{Z}{\underset{\diagdown}{\diagup}}C=O$$

wherein
R represents a monocyclic carbocyclic aromatic radical of the benzene series;
$R_1$ and $R_2$ are the same or different and each represents p-phenylene or p-phenylene substituted with lower alkyl, lower alkoxy, chlorine, bromine, lower alkanoylamino, lower alkylsulfonamido or benzamido;
$R_3$ represents hydrogen; lower alkyl; lower alkyl substituted with hydroxy, lower alkoxy, cyano, lower alkanoyloxy, lower carboalkoxy, chlorine, bromine, lower alkylsulfonyl, carbamoyl, lower alkylcarbamoyl, phenoxy, or lower alkylsulfonamido; lower alkyl-$OCOOCH_2CH_2-$; benzyl; phenyl; or phenyl substituted with lower alkyl, lower alkoxy, chlorine, or bromine;
$R_4$ represents lower alkylene, 2-hydroxypropylene, 2-chloropropylene, 2-cyanopropylene, or 2-acetoxypropylene; and
Z represents the carbon atoms which with

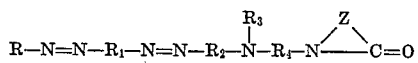

complete a pyrrolidinono radical, a piperidono radical or a phthalimidino radical.
2. A compound according to claim 1 wherein
R is phenyl or phenyl substituted with lower alkyl, lower alkoxy, chlorine, bromine, or lower alkanoylamino;
$R_3$ is lower alkyl or lower alkyl substituted with hydroxy, cyano, lower alkoxy, chlorine, bromine, or lower alkanolyoxy;
$R_4$ is lower alkylene; and

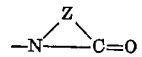

is 2-pyrrolidinono, 2-piperidono, or phthalimidino.

3. A compound according to claim 2 wherein R is ethylene or propylene, and

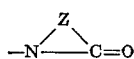

is 2-pyrrolidinono.

4. A compound as defined in claim 1 having the formula

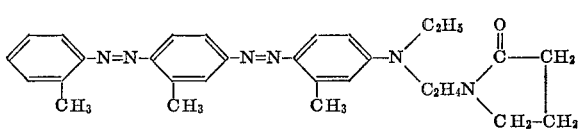

5. A compound as defined in claim 1 having the formula

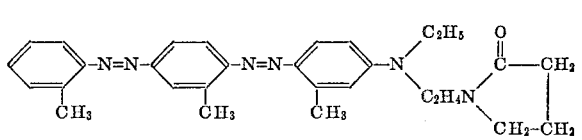

6. A compound as defined in claim 1 having the formula

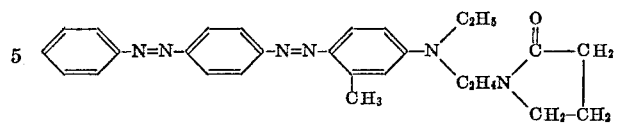

7. A compound as defined in claim 1 having the formula

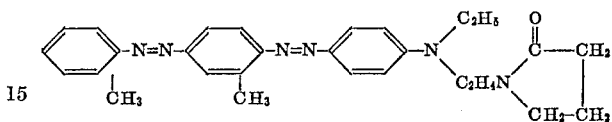

8. A compound as defined in claim 1 having the formula

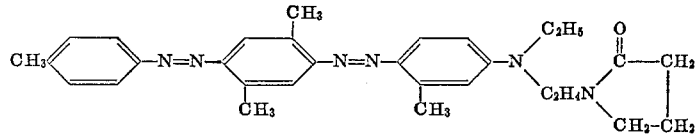

References Cited

UNITED STATES PATENTS 3,342,799  10/1967  Wallace et al. _____ 260—152

FLOYD D. HIGEL, *Primary Examiner.*

U.S. Cl. X.R.

8—41, 50; 260—294, 325, 326, 326.3